Aug. 5, 1952  A. A. BOSWELL  2,605,798
FEED DEVICE FOR FRUIT PEELERS
Filed April 25, 1947
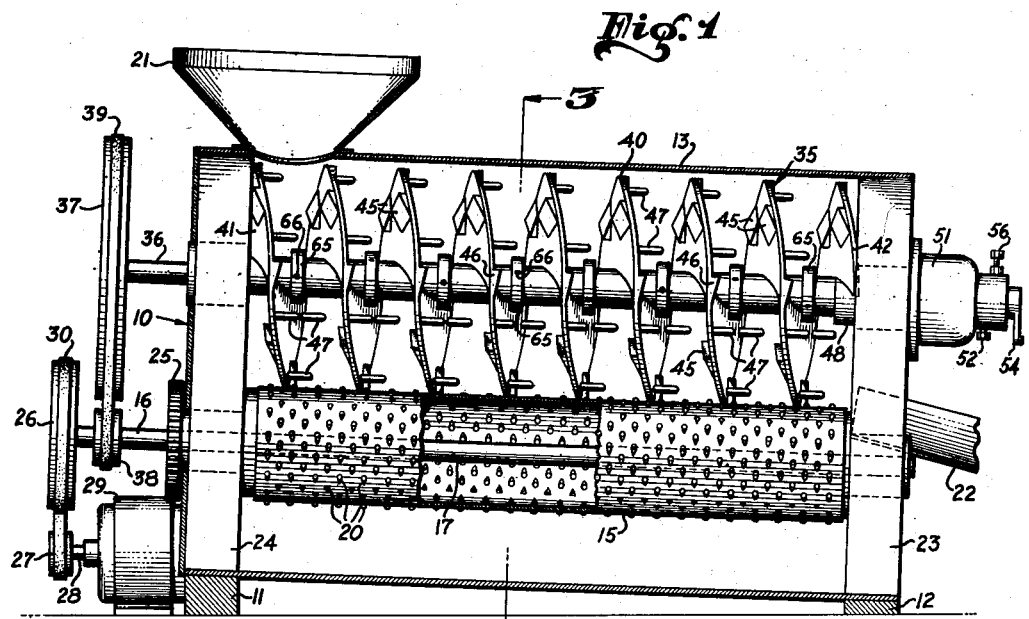
Fig. 1
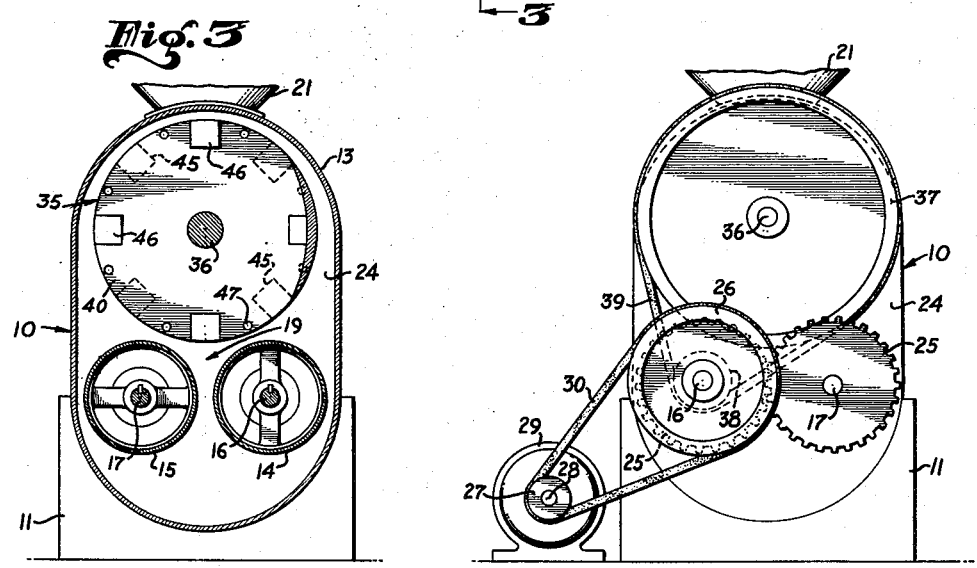
Fig. 3
Fig. 2
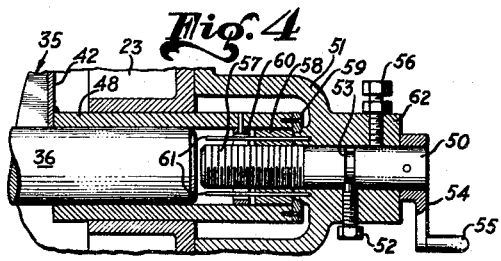
Fig. 4
INVENTOR:
ALBERT ALEXANDER BOSWELL.
BY Huebner, Maltby
and Beehler
ATTORNEYS.

Patented Aug. 5, 1952

2,605,798

UNITED STATES PATENT OFFICE 2,605,798

FEED DEVICE FOR FRUIT PEELERS

Albert Alexander Boswell, Visalia, Calif., assignor of one-half to May Jolley Boswell, Visalia, Calif.

Application April 25, 1947, Serial No. 743,839

7 Claims. (Cl. 146—49)

The invention relates to peeling machines of a type particularly well adapted to the peeling of fruits and more especially citrus fruits. The invention herein disclosed comprises an improvement upon my device disclosed in co-pending application, Serial No. 723,184, filed January 20, 1947, now abandoned.

Among the objects of the invention is to provide a new and improved feeding means by virtue of which fruit, while passing along a set of peeling rollers, is adapted to be moved at a predetermined rate and agitated sufficiently so that the peeling operation takes place uniformly on all sides of the fruit.

Another object of the invention is to provide a new and improved feeding device for fruit peelers which renders the peeler capable of peeling not only fruit which is round as to exterior dimensions, but also fruit which may be oblong or elongated or which may contain protrusions such as sometimes appear at the flower end of the navel orange.

Another object is to provide a new and improved feed device for a roller type fruit peeler by means of which fruit subjected to the peeling action can be regulated as to the rate of travel through the machine, and wherein the rate of travel may be made positive.

A further object is to provide a new and improved feed device for roller type peeling machines, the use of which permits sufficient variation in the speed of the peeling rollers, the length of the rollers and other features incorporated into the machine so that when the fruit is peeled the peeling may be removed with sufficient evenness on all sides so that virtually nothing but the membrane of the interior of the fruit remains upon completion of the operation, thus rendering the peeled fruit especially suited to canning and preserving.

A further object still is to provide a new and improved feed device for peeling machines which can be adjusted so as to operate more satisfactorily with fruit of different sizes, that is to say, the adjustment being such that the said devices may be set in advance for most efficient operation for a selected size of fruit and then readily changed in order that the efficiency of the operation may not be impaired when fruit of a different grade and size is to be processed.

Still further among the objects of the invention is to provide a combination fruit peeler and feeding device therefor which is simple in its construction, rugged as to its character, which can be readily taken apart and cleaned and which can be adjusted with respect to the size of fruit with particular ease by persons other than skilled mechanics, the adjustment being of such a character that it can be made without the necessity of stopping the machine.

With these and other objects in view, the invention consists in the construction, arrangement and combination of the various parts of the device whereby the objects contemplated are attained, as hereinafter more fully set forth, pointed out in the claims and illustrated in the accompanying drawing, in which:

Figure 1 is a longitudinal sectional view of the device.

Figure 2 is a left end view of the device.

Figure 3 is a cross sectional view of the device taken on the line 3—3 of Figure 1.

Figure 4 is a fragmentary longitudinal sectional view showing the mechanism used for changing the setting of the feed device for the accommodation of fruits of different diameters.

In the peeling of fruits of the character of citrus fruits which have a relatively thick skin it becomes necessary during the peeling operation to so agitate the fruit that as the skin is removed, little by little, all sides of the fruit will be presented to the peeling rollers so that the peel will be removed at a uniform rate from all sides. This presents a special problem in that customarily the skin is so thick that it only can be removed a fraction at a time, the grating portions of the device not being capable of biting into the skin to a sufficient depth to remove the entire thickness of skin with each bite. Customarily the fruit must be systematically agitated and rolled about during passage along the peeling rollers so that it does not remain in one position long enough for the peeling rollers to cut too deeply into one side or another. Moreover, inasmuch as fruit may vary considerably with respect to an average diameter, sufficient attention must be given to adjustments of the feed device so that it may be made to work with equal efficiency upon fruit of many different grades and sizes.

In an embodiment chosen to illustrate the invention there is shown a frame indicated generally by the reference character 10 which incorporates blocks 11 and 12 at opposite ends thereof, and a housing 13 herein illustrated as completely enclosing those portions of the machine which are used to actually process the fruit. Specifically the peeling mechanism is incorporated in a pair of greater rolls 14 and 15 mounted upon the frame and within the housing respectively upon shafts 16 and 17. The rollers are positioned parallel to each other and in spaced relation so that between and above them there is formed an elongated slot 19. The surface of each roller is provided with a series of knife-like projections 20 so as to give the surface the character of a grater, these projections being instrumental in removing the peel from the fruit. At one end of the housing is provided a hopper 21 which is adapted to feed fruit into the adjacent end of the housing one by one, and at the opposite end is a chute 22 adjacent an exit over which peeled fruit may be discharged. The shafts 16 and 17 are journalled respectively in heads 23 and 24 at opposite ends of the housing, each shaft having mounted thereon adjacent the feed end a gear 25, the gears being designed to mesh directly one with the other to rotate the rollers in opposite directions. For driving the rollers the shaft 16 extends in an endwise direction a sufficient length to have attached thereon a pulley 26 which is connected to a pulley 27 on the shaft 28 of a motor 29 by means of a belt 30. When gears 25 are of the same diameter and number of teeth the rollers will rotate at the same speed. A variation in speed can be had if need be by making one roller slightly greater in diameter than the other and with a larger number of teeth.

In order to force the fruit from the feed end of the rollers to the outlet end or exit at a proper rate there is provided what may be designated generally as an auger 35 mounted upon a shaft 36 which is journalled in the heads 23 and 24. At the left end of the shaft 36, as viewed in Figure 1, is a pulley 37 of relatively large diameter driven from a pulley 38 on the shaft 36 by a belt 39. It will be noted that the ratio of sizes of the pulleys 37 and 38 is such that the shaft 36 will customarily be rotated at a rate of speed considerably slower than the speed of rotation of the shaft 16 and customarily of the shaft 17.

In addition to the shaft 36 the auger should comprise a helical blade 40 having numerous turns between an end 41 and another end 42. During operation of the device the helical blade remains in fixed relationship to the shaft 36.

For fruit of any given diameter the distance between turns of the helical blade may be adjusted and the adjusted locations of the turns fixed in relation to the shaft. The location of the shaft 36 relative to the rolls 14 and 15 may also be set for most advantageous operation.

Rotation of the helical blade is sufficient to successively pass each individual fruit from the end adjacent the hopper 21 at a rate of speed determined by the relative rate of rotation of the auger with respect to the rate of rotation of the peeler rolls.

To more satisfactorily agitate the fruit to present all sides to the peeler rolls the turns of the auger blade are provided with projections. One set of projections comprising individual pieces or lugs 45 project toward the feed end of the machine. These projections are relatively low. On the opposite side of the turns of the blade are similar low projections 46. On the same side of the turns of the blade last mentioned may also be located elongated projections 47 which extend a substantial distance into the space between turns of the blade. Good results are obtained when the length of the projections are approximately the same as, or perhaps exceed, one-half of the diameter of the fruit which is to be peeled. Satisfactory results, however, may be experienced with most types of projections so long as they have sufficient length to slide beneath the fruit and lift the fruit from contact with the peeler rolls. Space between adjacent projections should exceed the average diameter of the fruit so that as the fruit is lifted upwardly by one projection it is capable of falling down again between that projection and the next succeeding projection. This becomes especially desirable when the distance between turns is lessened.

For greater overall efficiency it is desirable to have the blade adjustable in order that it may accommodate fruit of different average size rather than making it necessary to change the auger each time to accommodate each different grade size. This may be accomplished by constructing the auger blade 40 of resilient material, such for example as stainless steel. By way of example, in this construction the blade will be firmly attached at only the end 41 of the shaft, and the turns of the blade intermediate the ends should be arranged to slide loosely along the shaft.

At the other end 42 the blade is attached to a sleeve 43 which slides freely over the shaft 36. Movement of the sleeve in an axial direction is sufficient to either increase or decrease the distance between turns of the blade depending upon the direction of movement. To successfully adjust the blade there is provided a crank shaft 50 journalled within a housing 51 which is secured to the head 23. The crank shaft is retained in fixed position by means of a retaining screw 52, the end of which rotates within an annular recess 53 on the crank shaft. At the outside end the crank shaft is provided with a crank 54 equipped with a handle 55 by means of which it may be rotated. A lock screw 56 may be used to anchor the crank shaft in a selective position of rotation in order that any given adjustment may remain fixed.

At its inside end the crank shaft is provided with a threaded portion 57. This threaded portion is designed to threadedly engage a bushing 58 which is positioned within the right end of the sleeve 48, as viewed in Figure 4. A collar 59 may be used to enclose the bushing 58 on one side and a collar 60 may be used to confine the bushing on the other side. Pins 61 are shown extending through the bushing and into a hub 62 on the housing 51 in order to non-rotatably anchor the position of the bushing 58.

It may also be found desirable to provide collars 65 located between turns of the blade and adapted to be anchored in place upon the shaft 36 by means of set screws 66.

In operation, the auger is initially set to a proper size to accommodate a selected grade of fruit. This is accomplished by first releasing the lock screw 56 followed by rotation of the crank 54 in order to increase or decrease the distance between turns to the proper amount and then by tightening the lock screw 56 in order to set the adjustment. Meanwhile the set screws 66 may remain loose, and upon completion of the adjustment of the blade the set screws may be tightened upon the shaft to hold the position of each successive turn.

This completed, fruit may be dumped into the hopper 21 and the motor 29 started. The peeling rollers 14 and 15 are rotated in opposite directions, toward each other at their top sides, and at the same time the auger, sometimes called a screw, will be rotated at a speed customarily 6 to 12 times less than the rate of speed of rotation of the rollers. The speed at which the auger is set will depend to some extent upon the number of turns of the helical blade.

Fruits are dropped one by one into the space between the first two turns of the blade and fall into the slot 19 into a position of contact with the surface of the rollers. The projections 20 immediately begin to bite into the peel and at the same time the turns of the blade will progressively push the fruit in an axial direction along the slot. At the same time the projections 47 will successively lift the fruits out of the slot and then drop them back into the slot with a new unpeeled side falling upon the peeling rollers. This lifting and dropping occurs with sufficient frequency and variation to effectively present all sides of the fruit to the peeling rollers during the course of each fruit from the inlet end toward the outlet end. Action of the projections is sufficient so that all sides of the fruit will reach contact with the rollers even though the fruit may not be smooth and uniformly round.

Additional agitation of an effective sort is accomplished by the projections 45 which from time to time push the fruit in a reverse direction longitudinally with respect to the peelers. The projections 46 likewise having a pushing effect periodically upon the fruit while the fruit remains in contact with the rollers further enhances the smoothness of the peeling operation.

By proportioning the speed of the rotation parts and also the number of turns of the helical blade as well as establishing a proper length from end to end of the peeling rollers, the peeling operation upon fruit may be carried on to such completeness that all of the peel may be smoothly removed leaving nothing but the bare inside skin or membrane. Careful regulation and operation of the device may be carried on so as to produce a clean peeling job sufficient to permit fruit to be used for canning, preserving and for purposes other than the mere extraction of juice.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Having described my invention, what I claim and desire to secure by Letters Patent is:

1. A fruit peeler comprising a frame including a housing providing an interior chamber, a pair of spaced rollers on the frame having abrading surfaces adapted to cut away peel from fruit, a drive operating said rollers in opposite directions toward each other on the high sides thereof, and means for passing fruit from one end of the rollers to the other comprising a shaft on the frame lengthwise with respect to and spaced substantially centrally above the rollers, a helical element on the shaft having turns thereof spaced apart a distance corresponding to the diameter of fruit to be peeled, drive means for said helical element adapted to correlate the speed thereof with the speed of roller rotation and to advance the helical turns from a feed end to an exit end of the housing, and agitators adjacent the edges of turns of the helical element, certain of said agitators comprising projections spaced apart distances in excess of the diameter of said fruit and having of a length sufficient to periodically underlie the fruit and during rotation of said helical element being adapted to lift and drop the fruit.

2. A fruit peeler comprising a frame including a housing providing an elongated interior chamber, a pair of spaced parallel rollers on the frame having abrading surfaces adapted to cut peel from fruit, a drive operating said rollers in opposite directions toward each other on the high sides thereof, and means for passing fruit from one end of the rollers to the other comprising a shaft on the frame parallel to and spaced centrally above the rollers, a helical element on the shaft having turns thereof spaced apart a distance corresponding to the diameter of fruit to be peeled, drive means for said helical element adapted to correlate the speed thereof with the speed of roller rotation and to advance the helical turns from a feed end to an exit end of the housing, and agitators adjacent the edges of turns of the helical element on both sides thereof, agitators on one side comprising projections spaced apart one from another by distances in excess of the diameter of said fruit, and having a length in excess of half the average diameter of said fruit, and agitators on the sides of said turns facing the feed end comprising elevations thereon having a displacement outwardly from said turns less than the length of said projections.

3. A fruit peeler comprising a frame including a housing, a pair of spaced oppositely rotating rolls on the frame having abrading surfaces adapted to cut away peel from the fruit and forming a space therebetween, and means for passing the fruit from one end of the rolls to the other comprising an auger, said auger including a rotating shaft extending lengthwise with respect to and spaced above the rolls and a helical blade of flexible material extending around the shaft and dipping into the space, said blade having one end fixed in position and having the mid-portion thereof slidable along the shaft, and an adjusting mechanism on the frame secured to the other end of the blade comprising one element located on the frame and another element located on said other end of the blade and slidably mounted on the shaft, said elements having movement with respect to each other and being adapted thereby to vary the distance between turns of the blade.

4. A fruit peeler comprising a frame including a housing providing an elongated interior chamber, a pair of spaced oppositely rotating rolls on the frame having abrading surfaces adapted to cut away peel from the fruit and forming a space therebetween and means for passing the fruit from one end of the rolls to the other comprising an auger, said auger including a rotating shaft positioned lengthwise with respect to and spaced above the rollers and a helical blade of resilient material extending around the shaft and dipping into the space, said blade having one end fixed in position and having turns of the mid-portion thereof slidable along the shaft, and an adjusting mechanism on the frame secured to the other end of the blade comprising a crank element and a bushing element having a threaded engagement therewith, one of said elements being located on the frame and the other of said elements being located on said other end of the blade and slidably mounted on the shaft, said adjusting mechanism being adapted to vary the distance between turns of the blade.

5. A fruit peeler comprising a frame including a housing providing an elongated interior chamber, a pair of spaced oppositely rotating rolls on the frame having abrading surfaces adapted to cut away peel from the fruit and forming a space therebetween, and means for passing the fruit from one end of the rolls to the other comprising an auger mounted on the frame, said auger including a rotating shaft lengthwise with respect to and spaced above the rollers and a helical blade of resilient material extending around the shaft and dipping into the space, said blade having one end fixed in position and having turns of the midportion thereof slidable along the shaft, and an adjusting mechanism on the frame secured to the other end of the blade comprising a crank element and a bushing element having a threaded engagement therewith, one of said elements being located on the frame and the other of said elements being located on said other end of the blade and slidably mounted on the shaft, said adjusting mechanism being adapted to vary the distance between turns of the blade, and adjustable collars releasably mounted on the shaft between said turns adapted to hold the turns in fixed position upon completion of an adjustment.

6. A fruit peeler comprising a frame, a pair of grater rolls thereon adapted to rotate towards each other at the top when in operation, and means for moving fruits along said grater rolls comprising an extendible helical screw disposed lengthwise with respect to and above the rolls having the edge thereof between the rolls, said screw having smooth surfaced elements thereon displaced laterally relative to the turns thereof on one side of the turns and agitators adjacent the edges on the other side of the turns adapted respectively to periodically shift the fruit in different directions during passage along the rolls and a common synchronized drive for rotating said rolls and screw, and adjusting means attached to the screw and the frame adapted to extend and retract the screw thereby to change the distance between turns thereof.

7. A fruit peeler comprising a frame, a pair of spaced oppositely rotating rolls on the frame having abrading surfaces adapted to cut away peel from the fruit, and means for passing the fruit from one end of the rolls to the other comprising an auger mounted on the frame above and between the rolls, said auger comprising a helical blade of flexible material having one end secured to the frame and another end movable in a longitudinal direction, and an adjusting mechanism on the frame comprising one element attached to the frame and another element attached to the last defined end of said auger, said elements having axial movement with respect to each other, manual means adapted to initiate said axial movement and being adapted thereby alternatively to extend and contract the length of the auger and thereby also the distance between the turns thereof.

ALBERT ALEXANDER BOSWELL.

REFERENCES CITED

The following references are of record in the file of this patent:

UNITED STATES PATENTS

| Number | Name | Date |
|---|---|---|
| 744,774 | Lyon | Nov. 24, 1903 |
| 909,358 | Asplund | Jan. 12, 1909 |
| 1,186,317 | Hood | June 6, 1916 |
| 1,228,103 | Franklin | May 29, 1917 |
| 1,694,675 | White | Dec. 11, 1928 |
| 1,979,615 | Grayson | Nov. 6, 1934 |

FOREIGN PATENTS

| Number | Country | Date |
|---|---|---|
| 219,724 | Germany | Mar. 7, 1910 |
| 624,375 | France | Apr. 2, 1927 |